US010771970B2

(12) United States Patent
Neumann et al.

(10) Patent No.: US 10,771,970 B2
(45) Date of Patent: Sep. 8, 2020

(54) METHOD OF AUTHENTICATING COMMUNICATION OF AN AUTHENTICATION DEVICE AND AT LEAST ONE AUTHENTICATION SERVER USING LOCAL FACTOR

(71) Applicant: ADUCID S.R.O., Brno—Prizrenice (CZ)

(72) Inventors: Libor Neumann, Prague—Luziny (CZ); Vlastimil Klima, Prague (CZ)

(73) Assignee: ADUCID S.R.O., Brno—Prizrenice (CZ)

( * ) Notice: Subject to any disclaimer, the term of this patent is extended or adjusted under 35 U.S.C. 154(b) by 409 days.

(21) Appl. No.: 15/737,717

(22) PCT Filed: Jul. 6, 2016

(86) PCT No.: PCT/CZ2016/050022
§ 371 (c)(1),
(2) Date: Dec. 18, 2017

(87) PCT Pub. No.: WO2017/005230
PCT Pub. Date: Jan. 12, 2017

(65) Prior Publication Data
US 2018/0198615 A1    Jul. 12, 2018

(30) Foreign Application Priority Data
Jul. 7, 2015 (CZ) .............................. PV 2015-474

(51) Int. Cl.
*H04W 12/06* (2009.01)
*H04L 29/06* (2006.01)
*H04L 9/32* (2006.01)

(52) U.S. Cl.
CPC ............ *H04W 12/06* (2013.01); *H04L 9/321* (2013.01); *H04L 63/083* (2013.01); *H04L 63/0853* (2013.01); *H04L 63/0861* (2013.01)

(58) Field of Classification Search
CPC ... H04L 9/321; H04L 63/083; H04L 63/0853; H04W 12/06
See application file for complete search history.

(56) References Cited

U.S. PATENT DOCUMENTS

| | | | | |
|---|---|---|---|---|
| 6,067,621 A * | 5/2000 | Yu | ............................ | G06F 21/34 713/172 |
| 6,292,897 B1 * | 9/2001 | Gennaro | .................. | H04L 9/321 713/156 |
| 2002/0002678 A1 * | 1/2002 | Chow | ...................... | G06F 21/31 713/169 |
| 2004/0078571 A1 * | 4/2004 | Haverinen | ............ | H04L 9/0869 713/168 |
| 2004/0187018 A1 * | 9/2004 | Owen | ...................... | G06F 21/31 713/184 |
| 2006/0041759 A1 * | 2/2006 | Kaliski, Jr. | .......... | H04L 63/0869 713/184 |
| 2007/0276925 A1 * | 11/2007 | La Joie | .............. | G06Q 30/0256 709/219 |
| 2013/0124292 A1 * | 5/2013 | Juthani | ................... | G06F 21/41 705/14.26 |
| 2014/0040628 A1 * | 2/2014 | Fort | ........................ | G06F 21/34 713/182 |
| 2015/0082032 A1 * | 3/2015 | Bruce | ...................... | H04L 63/08 713/168 |
| 2018/0198615 A1 * | 7/2018 | Neumann | ............. | H04L 63/083 |

FOREIGN PATENT DOCUMENTS

AU    2012 200 393 A1    2/2012

OTHER PUBLICATIONS

International Search Report and Written Opinion for PCT/CZ2016/050022 filed Jul. 6, 2016.
Anonymous: "Cryptographic hash function—Wikipedia, the free encyclopedia" Feb. 2015 pp. 1-8, Retrieved from the Internet: URL:https://en.wikipedia.org/w/index.php?title=Cryptographic hash function&oldid=645419281—[retrieved on Sep. 15, 2016].

* cited by examiner

*Primary Examiner* — Ponnoreay Pich
(74) *Attorney, Agent, or Firm* — Notaro, Michalos & Zaccaria P.C.

(57) ABSTRACT

A method of authenticating the communication of an authentication device and at least one authentication server using a local factor with creation of secret information shared by the authentication device and the authentication server; the reference information is derived from the secret information shared by the authentication device and the authentication server, where the manner of derivation is the same on the authentication device and on the authentication server; furthermore, the authentication device creates transformed reference information by means of cryptographic transformation from the reference information, where the local factor chosen and entered by the user or obtained from a medium or from the surrounding environment is used as an input in this cryptographic transformation, and where only the transformed reference information is stored on the authentication device and only the reference information is stored on the authentication server.

6 Claims, No Drawings

METHOD OF AUTHENTICATING COMMUNICATION OF AN AUTHENTICATION DEVICE AND AT LEAST ONE AUTHENTICATION SERVER USING LOCAL FACTOR

FIELD OF ART

The invention relates to the field of security of information and communication technologies.

The invention concerns protection of means, in particular devices, used for authentication in local or remote electronic communication, against abuse by unauthorised persons.

BACKGROUND ART

In the art, methods are known for securely establishing secure protected electronic communication (authentication) using authentication devices communicating with authentication servers and offering various levels of security, i.e. various levels of resistance against abuse by an unauthorised person.

Significant risks connected with abuse of authentication means used in electronic communication include unauthorised obtaining of the means themselves and their use by an unauthorised person instead of an authorised person.

The present invention aims to provide a method of authentication of communication of these authentication devices with authentication servers that will not allow an attacker to obtain the user's authentication information (the local factor), not even if he obtains the authentication means or their data.

DISCLOSURE OF THE INVENTION

The present invention provides a method of authenticating communication of an authentication device and an authentication server using a local factor chosen by the user.

The local factor is initialized within an initializing authentication transaction, wherein a secret information shared by the authentication device and the authentication server is created, and a reference information is derived from said secret information shared by the authentication device and the authentication server, whereas said reference information is derived from said secret information in the same manner and independently in the authentication device as well as in the authentication server; the authentication device creates a transformed reference information from the reference information by means of cryptographic transformation, whereas a local factor chosen and entered by the user or obtained from a medium or from the surrounding environment is used as an input in said cryptographic transformation, and whereas only the transformed reference information is stored on the authentication device and only the reference information is stored on the authentication server. The cryptographic transformation used is a two-way cryptographic transformation.

In each subsequent authentication transaction using the initialized local factor (i.e. initialized by the method described above), the authentication device obtains the local factor from the user, from a medium or from the surrounding environment, the reference information is derived from the stored transformed reference information in the authentication device by means of a cryptographic transformation (inverse to the cryptographic transformation used in the creation of the transformed reference information) using the obtained local factor as an input for the cryptographic transformation of the transformed reference information, and the thus obtained reference information is transmitted in a secure manner, preferably using a shared authenticated random information, to the authentication server, where it is evaluated with the use of the reference information stored in the authentication server.

In one embodiment, the reference information from the authentication device is transmitted to the authentication server in an encrypted form, wherein a shared authenticated random information valid only for one authentication transaction is used. In one embodiment, the secure transmission may include encryption, so that the authentication server can decrypt the encrypted reference information received from the authentication device and evaluate it using the stored reference information. In another embodiment, the secure transmission may include applying a one-way cryptographic transformation to the reference information and to the shared authenticated random information and the output of this transformation is transmitted to the authentication server, and the same one-way cryptographic transformation is applied in the authentication server to the reference information stored in the authentication server and to the shared authenticated random information; both these results are then compared on the authentication server.

When changing the local factor from an original local factor to a new local factor, the change is carried out as follows: the authentication device processes the original local factor entered by the user, obtained from a medium or from the surrounding environment, said original local factor is used as an input for the (inverse) cryptographic transformation applied to the transformed reference information in order to obtain the reference information, and subsequently a new local factor entered by the user or obtained from a medium or from the surrounding environment is processed in the authentication device as an input for a cryptographic transformation applied to the reference information in order to obtain a new transformed reference information, wherein in the course of the change procedure the authentication device verifies with the authentication server the accuracy of the original local factor entered by the user or obtained from a medium or from the surrounding environment. In this way, the reference information stored on the server may remain the same, regardless of the change of the local factor.

The authentication device is a device used by the user for authentication and for authenticated communication with the server. The authentication device can be, e.g., a computer, a mobile phone, a tablet, a smartwatch, a chip card, etc.

The authentication server is a server communicating with the authentication device; this can be e.g. a service provider's (relying party's) server.

The local factor is a secret information held by the user. It can be in the form of information obtained by the authentication device directly from the user (password, PIN, face image recognition, fingerprint, gesture, etc.) or information stored in a medium (e.g. a card, a chip, a bracelet, a smartwatch) or information obtained by the authentication device from the surrounding environment (information from a Wi-Fi network, QR code, wireless payment card recognition, etc.). The form of the local factor may also depend on the technology which the authentication device is capable of using (e.g. keyboard, multimedia-based input device, camera, chip reader, NFC, Bluetooth, USB, etc.).

The local factor may utilise various technologies and thus influence the user features and security parameters of the local factor. The technical means of the authentication device must support the relevant local factor technology for the local factor to be usable with this authentication device. These technical means must ensure that the verification of the local factor occurs locally, i.e. over short distance. Local communication (short-distance communication) is a communication which excludes the possibility of the communicating subjects disclosing information to third parties or the communication being eavesdropped or intercepted.

The local factor technology may optionally use other technical means apart from the technical means of the authentication device. Said other technical means may include for example a personal device which the user commonly uses for other purposes and carries it with him/herself constantly or very often. This can be e.g. an electronic watch using Bluetooth communication, a sports electronic wristband or other "wearable" electronics using Bluetooth communication, electronic identification documents using NFC communication, such as an electronic passport or a pre-paid electronic ticket using NFC-compatible chip, a NFC-compatible payment card, etc.

The initializing authentication transaction is a transaction where the user chooses the local factor, i.e. its technology and value. The initializing authentication transaction may also be called "creation of the local factor".

The reference information is information created during the initializing authentication transaction, which is not derived from the local factor and it is not related to the local factor. It is derived from randomly generated secret information shared by the authentication device and the authentication server during the initializing authentication transaction. The reference information is stored in the authentication server; it is not stored in the authentication device.

The transformed reference information is a product of a two-way cryptographic transformation carried out in the authentication device using the reference information, with the local factor serving as an input for cryptographic transformation. However, the transformed reference information is not derived from the local factor, and the local factor cannot be retrieved from the transformed reference information. The transformed reference information is stored in the authentication device and it is not transmitted to the authentication server. Any kind of cryptographic transformation to which there is an inverse cryptographic transformation can be used and the local factor is one of the inputs used by this cryptographic transformation.

The authentication transaction is a transaction comprising a primary authentication and an authentication using the local factor.

The secret information is information shared between the authentication device and the authentication server; it is created during the initializing authentication transaction and it can include any random or pseudorandom information. It serves as the source of the reference information within the initializing transaction.

The shared authenticated random information is created during authentication transactions following after the initializing authentication transaction; it is shared between the authentication device and the authentication server and can serve as an input for the cryptographic transformation applied to the reference information in order to increase the security of its transmission. This cryptographic transformation may be one-way (e.g. a hash function) or two-way (e.g. encryption and decryption). Preferably, the shared authenticated random information is valid always solely for the given transaction.

The secret information shared between the authentication device and the authentication server and/or the shared authenticated random information may preferably be a secondary authentication secret (SAS) created during the primary authentication.

Primary authentication is a first step of any authentication transaction in which the authentication device and the authentication server authenticate each other (e.g. using public and private keys). During primary authentication, a secondary authentication secret is created, which is an authenticated information shared between the authentication device and the authentication server and which is preferably valid only for the authentication transaction in which it is created. Primary authentication also creates a secured communication channel through which all further communication between the authentication device and the authentication server is conducted during the given authentication transaction.

The method of the invention provides for a creation of the local factor and its use in further authentication transactions without the need for storing the local factor or any other information from which the local factor could be retrieved (e.g. a product of the cryptographic transformation applied to the local factor) in the authentication device or in the authentication server. This significantly increases the security of the authentication against an attack aimed at obtaining the local factor, since even if the attacker obtains the reference information from the authentication server or the transformed reference information from the authentication device, this information does not include any information leading to the local factor or allowing to retrieve the local factor. The local factor entered in the authentication device is not transmitted anywhere during the authentication transaction and it is forgotten once the transaction is completed or after a pre-determined period of time.

The local factor is an input used by a two-way cryptographic transformation in the authentication device during derivation (encryption) of the transformed reference information from the reference information and vice-versa during the derivation (decryption) of the reference information from the transformed reference information. Without the local factor being obtained by the authentication device, i.e. without it being entered by the user or obtained from the surrounding environment or from a medium during the authentication transaction, the cryptographic transformation cannot correctly derive (e.g. decrypt) the reference information from the transformed reference information.

The method according to the invention further allows to authenticate communication with another authentication server using the same local factor (i.e. to create the same local factor on another authentication server); in the initializing authentication transaction with said another authentication server, a secret information shared only between the authentication device and said another authentication server is created, wherein a reference information is derived from this secret information (since this secret information is pseudorandom and thus different from the one in the initializing transaction with any previous authentication server in which the same local factor was previously created, also the created reference information is different for each authentication server), said reference information is given to said another authentication server and the authentication device. and the authentication device creates a transformed reference information from the reference information by means of two-way cryptographic transformation using the local factor entered by the user, obtained from a medium or from the surrounding environment, as an input for the cryptographic transformation, whereas, before the authentication is completed, the authentication device connects to at least one authentication server in which the local factor has already been created, and verifies on this server that a correct local factor has been entered or obtained from a medium or the surrounding environment. If the correct local factor has not been entered or obtained, the authentication transaction with said another authentication server is not completed and the local factor is not created in said another authentication server. If the correct local factor has been entered or obtained, the authentication transaction with said another authentication server is completed and the local factor is created in said another authentication server, thus allowing to use the local factor for subsequent authentication transactions with the said another server.

Furthermore, several local factors may be merged into one local factor. This is done when the user has created several local factors, for example in different authentication servers, and wishes to replace them with a single one. In that case, all local factors which are to be merged are entered in the authentication device or obtained from a medium or from the surrounding environment, and the authentication device verifies each of the local factors with, respectively, at least one authentication server where the local factor has been created, and subsequently each of the replaced local factors is processed so that it is used as an input for a cryptographic transformation applied to the transformed reference information in order to obtain the reference information for each authentication server for which the local factor to be merged is valid, and subsequently the local factor which is to replace all the other local factors is processed in the authentication device so that it is used as an input for a cryptographic transformation applied to the reference information in order to obtain a new transformed reference information for each authentication server. In this way, the reference information stored in the server may remain the same, regardless of the change of the local factor caused by the merger.

Essential features of the present invention thus include the method of creation (initialization) of the local factor and the method of subsequent authentication using said local factor, which ensure that no authentication device and no authentication server store any information derived from the local factor. This means that even when all information stored on these devices and servers is obtained, the local factor cannot be retrieved. Therefore, the local factor is fully and exclusively controlled by the user. During creation of the local factor as well as during authentication, the local factor is used as one of the inputs for a cryptographic transformation to create transformed reference information, and for an inverse cryptographic transformation to obtain the reference information from the transformed reference information.

Using the method according to the invention also enables one user to use a single local factor for more than one authentication server. At the same time, each authentication server contains different reference information, since the reference information is generated independently for each authentication server. This is enabled by the fact that the reference information is independent of the local factor. From the viewpoint of the user, the local factor remains the same for different authentication servers (e.g. service providers (relying parties)), while from the viewpoint of the authentication server, the authenticating reference information is completely different for each server, and also the information conveyed during authentication is completely different for each server.

EXAMPLES OF CARRYING OUT THE INVENTION

Creation (Initialisation) of the Local Factor

The local factor is created in the process of the initiation of authentication transaction. Within this transaction, secret information, which is the secondary authentication secret, shared between the authentication device and the authentication server is created. The user is prompted to scan or enter the local factor; the choice of the technology of the local factor may be a part of this task. The reference information is derived in the authentication device from the secret information shared between the authentication device and the authentication server, for example by means of one-way cryptographic transformation.

The local factor and the reference information derived from the secret information, shared between the authentication device and the authentication server, is used as an input in cryptographic transformation, i.e. the reference information is encrypted using the entered local factor. The result of this cryptographic transformation in the transformed reference information is stored only in the authentication device and is not transferred anywhere else. Neither the reference information nor the local factor are stored on the authentication device.

On the authentication server, the reference information is derived from the secret information shared between the authentication device and the authentication server in the same way as in the authentication device (in this example, it is derived from the secondary authentication secret). The aforesaid reference information is stored in the authentication server and is not transferred elsewhere.

If necessary, the verification of whether or not a specific local factor belongs to an authorized user may be performed during or after the initialisation of the local factor, for example by organisational measures, i.e. for example the local factor can be verified by a user accompanied by another trustworthy person.

Verification of the Local Factor in Subsequent Authentication Transactions

In each subsequent authentication transaction where the user has to demonstrate the knowledge or ownership of the local factor for the purpose of verification that the authentication device is held by an authorized user, the following procedure is used. Before or after the primary authentication with the authentication server, the authentication device prompts the user to enter or scan the local factor. Within the primary authentication or after, shared authenticated random information is created. The shared authenticated random information is always valid only for a single authentication transaction.

The authentication device uses inverse cryptographic transformation with the use of the local factor to create the reference information from the stored transformed reference information, i.e. it for example decrypts the transformed reference information using a user-entered or user-scanned local factor to obtain the reference information. One-way cryptographic transformation with the use of the shared authenticated random information is then applied by the authentication device to the thus obtained reference information and the result, the derived authentication information, is transmitted to the authentication server. The authentication server, after a potential check of integrity of the transmitted information, uses the same one-way cryptographic transformation as used by the authentication device to calculate the value of the derived authentication information with the use of the reference information and the shared authenticated random information. By comparison of the value of the derived authentication information created and transmitted by the authentication device and the derived authentication information created by the authentication server, the authentication server verifies the correspondence of the verified local factor with the local factor created during the initiating authentication transaction.

Creation of the Local Factor for Another Service Provider (Relying Party)

In the process of the initiation of authentication transaction with another authentication server, the same local factor (from the point of view of the user) can be used for authentication with another authentication server. During creation (initialisation) of the local factor on the second server within the initiating authentication transaction, the correspondence of the user-entered local factor with the local factor created earlier for authentication to the first server is verified first. The verification is carried out in that the authentication device creates a secured communication channel to the authentication server where the local factor was created earlier, and the verification of the local factor described above is carried out. In case of a positive result of the verification, reference information is derived from the secret information shared between the authentication device and the authentication server by means of cryptographic transformation.

The local factor and the reference information derived from the secret information shared between the authentication device and the authentication server are used as an input for the cryptographic transformation, through which the reference information is encrypted using the entered local factor. The result of this cryptographic transformation, which consists in the transformed reference information, is stored in the authentication device and is not transferred anywhere else. The reference information is not stored on the authentication device.

On the authentication server, the same method as on the authentication device is used to derive the reference information from the secret information shared by the authentication device and the authentication server. The aforesaid reference information is stored on the authentication server and is not transferred elsewhere.

Since every secret information created in the process of the initiation transaction with each of the authentication servers is different, the reference information as well as the transformed reference information are different for each authentication server.

Change of the Local Factor

The user enters an original local factor and a new local factor in the authentication device (when entering a new local factor, the user may potentially also choose its technology). The authentication device verifies the correctness of the entered original local factor with at least one authentication server where the local factor has been created (see "Verification of the local factor" above for description of the procedure). If the result of the verification is positive, the authentication device decrypts the transformed reference information for each of the authentication servers using the original local factor in order to obtain the reference information for each authentication server. Subsequently, the authentication device creates new transformed reference information for each authentication server by deriving it from the appropriate reference information by means of cryptographic transformation using the new local factor as an input. Since this procedure does not involve changing the reference information itself, no change needs to be done on the authentication servers.

Merging the Local Factors

The user has created several different local factors for various service providers (relying parties). In order to merge all the local factors into one local factor for all service providers (relying parties), the user first enters all the local factors and each is verified with the authentication server where the given local factor has been created (see "Verification of the local factor" above for description of the procedure). If all local factors are successfully verified, the authentication device decrypts the transformed reference information for each of the authentication servers using the appropriate local factor for the given authentication server in order to obtain the reference information for each authentication server. Subsequently, the authentication device creates the appropriate transformed reference information for each authentication server by deriving it from the appropriate reference information by means of cryptographic transformation, using the local factor which is to serve as the single local factor after the merger of the local factors. Since this procedure does not involve changing the reference information itself, no change needs to be done on the authentication servers.

The invention claimed is:

1. A method for authenticating the communication of an authentication device and at least one authentication server using a local factor, wherein a secret information shared between the authentication device and the at least one authentication server is created within an initializing authentication transaction, characterized in that a reference information is derived from the secret information shared between the authentication device and the at least one authentication server, wherein the reference information is derived from the secret information in the same way in the authentication device and in the at least one authentication server; and the authentication device creates a transformed reference information from the reference information by means of a cryptographic transformation, wherein a local factor chosen and entered by the user or obtained from a medium or from the surrounding environment is used as an input in said cryptographic transformation, and where only the transformed reference information is stored in the authentication device and only the reference information is stored in the at least one authentication server, wherein the local factor is a secret information held by the user; and wherein the local factor or any information from which the local factor could be retrieved is not stored in the authentication device nor in the at least one authentication server, and wherein in each subsequent authentication transaction using the local factor initialized in the initializing authentication transaction, the authentication device obtains the local factor from the user, from a medium or from the surrounding environment, and the reference information is derived in the authentication device from the stored transformed reference information by means of inverse cryptographic transformation using said obtained local factor as an input for said inverse cryptographic transformation, and the thus obtained reference information is transmitted to the at least one authentication server, where it is verified using the reference information stored in the at least one authentication server.

2. The method according to claim 1, characterised in that the reference information is transmitted from the authentication device to the at least one authentication server in an encrypted form, wherein shared authenticated random information, preferably valid only for one authentication transaction, is used for the encryption.

3. The method according to claim 1, characterised in that the reference information is transmitted from the authentication device to the at least one authentication server in the form of a product of one-way cryptographic transformation, preferably using a shared authenticated random information as an input for the cryptographic transformation, more preferably using a shared authenticated random information valid only for the given authentication transaction as an input for the cryptographic transformation.

4. The method according to claim 1, characterised in that when performing a change of the local factor from an original local factor to a new local factor, the change is carried out as follows: the authentication device processes the original local factor entered by the user, obtained from a medium or from the surrounding environment by using it as an input for the inverse cryptographic transformation applied to the transformed reference information in order to obtain reference information; and the new local factor entered by the user, obtained from a medium or from the surrounding environment is processed in the authentication device so that it is used as an input for the cryptographic transformation applied to the reference information in order to obtain a new transformed reference information; wherein in the process of performing the change, the authentication device verifies with the at least one authentication server the accuracy of the original local factor entered by the user or obtained from a medium or from the surrounding environment.

5. The method according to claim 1, characterised in that authentication of the communication of the authentication device with another authentication server using the same local factor is initialized as follows: first, a secret information shared only between the authentication device and said other authentication server is created within the initializing authentication transaction with said other authentication server, wherein a reference information is derived from said secret information, and the authentication device then creates a transformed reference information from the reference information by means of a cryptographic transformation using the local factor entered by the user, obtained from a medium or from the surrounding environment as an input; wherein before the authentication is completed, the authentication device connects to at least one authentication server where the local factor has already been created, and verifies with this authentication server that a correct local factor has been entered or obtained from a medium or the surrounding environment.

6. The method according to claim 1, characterised in that several local factors are merged into one local factor as follows: all local factors which are to be merged are entered in the authentication device or obtained from a medium or from the surrounding environment, and the authentication device verifies each of the local factors with, respectively, at least one authentication server where the local factor has been created, and subsequently each of the replaced local factors is processed so that it is used as an input for an inverse cryptographic transformation applied to the transformed reference information in order to obtain the reference information for each authentication server for which the local factor to be merged is valid, and subsequently the local factor which is to replace all the other local factors is processed in the authentication device so that it is used as an input for a cryptographic transformation applied to the reference information in order to obtain a new transformed reference information for each authentication server.

* * * * *